United States Patent [19]

Magenheim et al.

[11] Patent Number: 4,688,185
[45] Date of Patent: Aug. 18, 1987

[54] MICROWAVE ICE ACCRETION MEASURING INSTRUMENT

[75] Inventors: Bertram Magenheim, Bethesda, Md.; James K. Rocks, Leesburg, Va.

[73] Assignee: University Research Foundation, Greenbelt, Md.

[21] Appl. No.: 639,298

[22] Filed: Aug. 10, 1984

Related U.S. Application Data

[63] Continuation-in-part of Ser. No. 337,200, Jan. 5, 1982, Pat. No. 4,470,123, and a continuation-in-part of Ser. No. 596,340, Apr. 3, 1984.

[51] Int. Cl.$^4$ .................... B64D 15/00; G01R 27/04; G08B 19/02; G01B 15/00
[52] U.S. Cl. .............................. 364/563; 244/134 F; 324/58.5 R; 340/580
[58] Field of Search ........... 244/134 R, 134 D, 134 F; 324/58 R, 58 A, 58.5 R, 58.5 A; 340/580; 364/563

[56] References Cited

U.S. PATENT DOCUMENTS

| | | | |
|---|---|---|---|
| 2,789,281 | 4/1957 | Short et al. | 244/134 F |
| 3,240,054 | 3/1966 | Roth | 340/582 X |
| 3,836,846 | 9/1974 | Overall et al. | 324/58.5 B |
| 4,054,255 | 10/1977 | Magenheim | 244/134 F |
| 4,060,212 | 11/1977 | Magenheim | 340/580 X |
| 4,095,456 | 6/1978 | Edgington | 244/134 F X |

OTHER PUBLICATIONS

Magenheim, B. and Rocks, J., "A Microwave Ice Accretion Measurement Instrument MIAMI", paper presented at the AIAA 20th Aerospace Sciences Meeting, Jan. 11-14, 1982.
Magenheim, B. and Rocks, J., "Microwave Ice Accretion Measurement Instrument (MIAMI)", *Journal of Aircraft*, vol. 20, No. 3, Mar. 1983, pp. 262 et seq.

*Primary Examiner*—Errol A. Krass
*Assistant Examiner*—Joseph L. Dixon
*Attorney, Agent, or Firm*—Pollock, Vande Sande & Priddy

[57] ABSTRACT

An ice measurement instrument includes a waveguide operating in a transmission mode passing energy from an input port to an output port. The resonant frequency of the waveguide depends on the presence and/or thickness of ice at a measuring location. The energy applied to the input port is swept in frequency from a first frequency to a second frequency at or above an ice-free resonant frequency of said waveguide, and back to said first frequency. Energy received at the output port is peak detected to provide a detection signal with four recognizable transitions identifying a pair of peaks which correspond to the resonant frequency of the waveguide. The time delay between these peaks can be used, in comparison with the time delay corresponding to an ice-free condition, to determine ice thickness.

29 Claims, 19 Drawing Figures

STATE TRANSITION TABLE

| FROM STATE | TO LEVEL 0 | 1 | 2 | 3 |
|---|---|---|---|---|
| 0 | 2-TD | 3-PU TD |  | 1-PU |
| 1 | 5-PD TD | 3-TD | 4-PD |  |
| 2 |  | 3-PU | 11 | 12 |
| 3 | 5-PD |  | 11 | 12 |
| 4 | 5-TD | 14 |  | 12 |
| 5 |  | 6-QU | 7-TU | 8-QU TU |
| 6 | 9-QD |  | 0-QD TU | 8-TU |
| 7 | 13 | 14 |  | 8-QU |
| 8 | 13 | 14 | 0-QD |  |
| 9 |  | 14 | 0-TU | 12 |
| 10 | 13 | 14 | 11 | 12 |
| 11 | 15 | 3 |  | 12 |
| 12 | 5 | 3 | 16 |  |
| 13 | 12 | 14 | 17 | 8 |
| 14 | 18 |  | 0 | 8 |
| 15 |  | 14 | 7 | 8 |
| 16 | 15 | 3 |  | 1 |
| 17 | 2 | 3 |  | 12 |
| 18 |  | 6 | 17 | 8 |

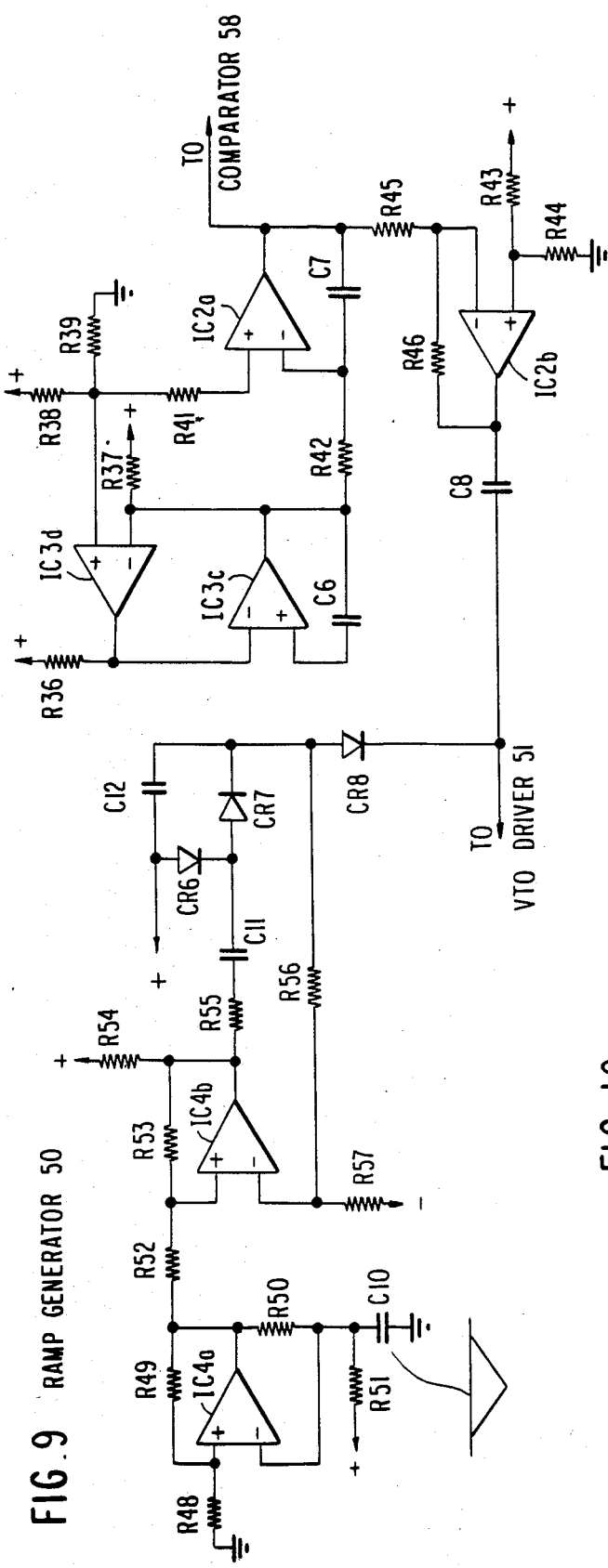
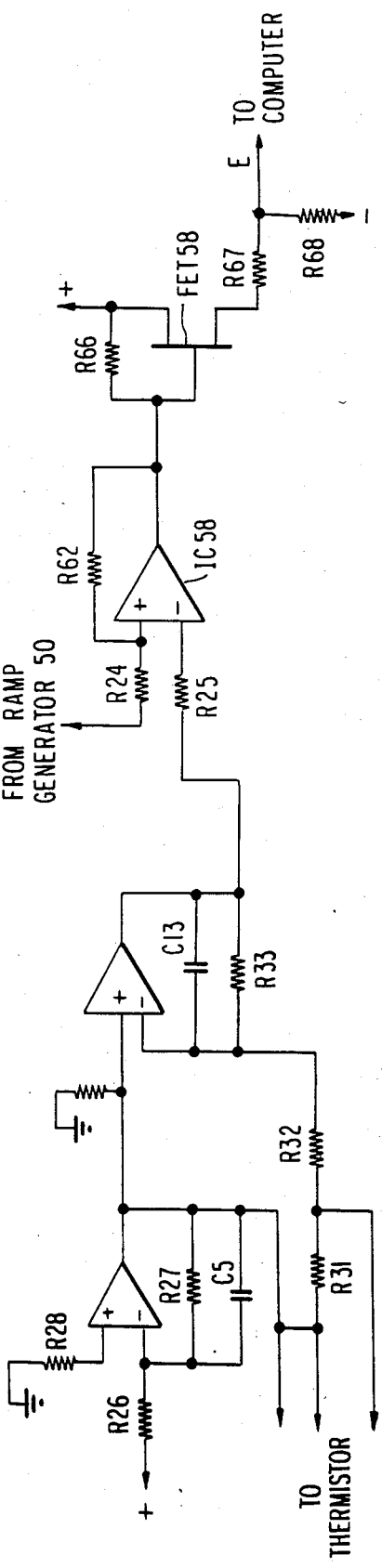
FIG. 9 RAMP GENERATOR 50
FIG. 10 COMPARATOR 58

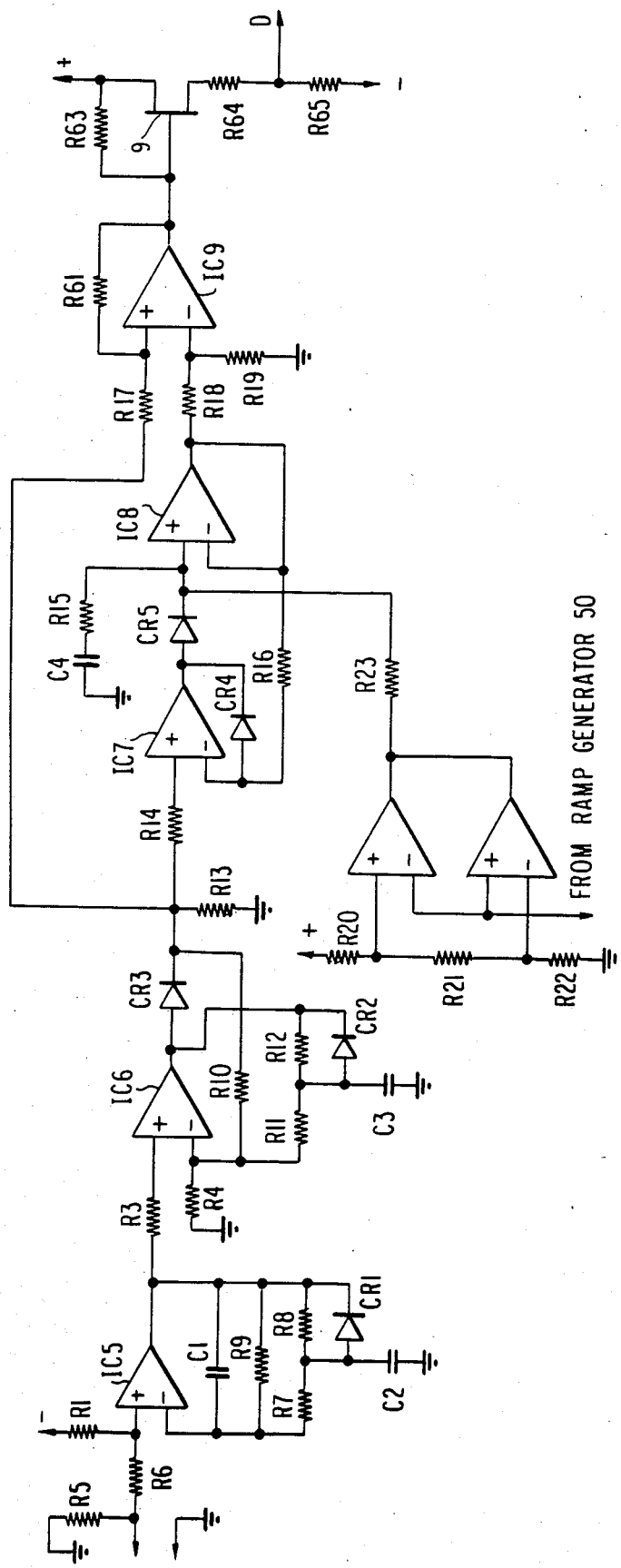
FIG. 11   AMPLIFIER 56   PEAK DETECTOR 57

MICROWAVE ICE ACCRETION MEASURING INSTRUMENT

RELATED APPLICATIONS

The present application is a continuation-in-part of applicants' prior co-pending application Ser. No. 337,200 filed Jan. 5, 1982, now U.S. Pat. No. 4,470,123 which issued on Sept. 4, 1984 and application Ser. No. 596,340 filed Apr. 3, 1984. The subject matter of the referred to applications are incorporated herein by this reference.

DESCRIPTION

1. Technical Field

The present invention relates to an improved apparatus for indicating ice thickness and rate of ice thickness growth on surfaces which may be subject to ice accretion as a result of weather conditions. The invention finds particular utility in the aviation field for detecting and measuring ice thickness and rate of ice growth on air foil surfaces.

2. Background Art

The problems caused by icing, particularly in the aviation field, and some solutions to those problems heretofore provided by the prior art are summarized in Magenheim prior U.S. Pat. 4,054,255 entitled "Microwave Ice Detector" and 4,060,212 entitled "De-Icing Apparatus and Method". The research which led to the inventions described in the above-mentioned patents is more thoroughly discussed in "Demonstration of the Microwave Ice Protection Concept", a report prepared for the Applied Technology Laboratory, U.S. Army Research and Technology Laboratories (USAAMRDL-TR-77-34) dated May 1978, and prepared under contract DAAJ02-76-C-0052. While that research was primarily directed to an alternative to pneumatic and resistance heated air foil de-icers, it did report on resonant effects in a waveguide apparently caused by ice accretion.

The ice detector described in the '255 patent included a surface waveguide mounted adjacent an air foil in which ice accretion could be expected. Microwave energy was coupled to the surface waveguide via a dual directional coupler, and energy reflected back from the waveguide was monitored. Ice accretion, across the surface of the waveguide, changed the physical reflection coefficient of the waveguide, and this could be detected by comparing the energy input to the waveguide and the energy reflected therefrom, in the dual directional coupler. In the course of that research I noted that ice accretion apparently changed the resonant frequency of the waveguide, and ice detectors postulated in the cited report were based on this principle.

Since that time we have discovered that a device can be constructed for detection of icing, measuring ice thickness and detecting the rate of ice growth, by a device which is different from that described in either the '255 patent or the cited report.

More particularly, in a first embodiment of the invention the region to be monitored for ice accretion is provided with a resonant surface waveguide (or trough line). The waveguide is mounted flush, with the surface being monitored. Since it is non-intrusive it does not disturb air flow and thus may be located adjacent any air foil surface. Microwave energy is coupled to the waveguide. The microwave energy is coupled via a feed point. A controlled oscillator provides the microwave energy at a controllable frequency. A detector is coupled to the surface waveguide at a point displaced from the feed point and is responsive to electrical energy incident on the detector. A measurement device is coupled to the controlled oscillator for indicating the frequency deviation of the controlled oscillator from a quiescent frequency, and finally control means are provided to control the frequency of oscillation of the controlled oscillator. In a first or open loop embodiment of the invention, an operator can operate a control means to vary the frequency of controlled oscillations and monitor the output of the detector, which may for example comprise a meter. The quiescent frequency is selected as the waveguide resonant frequency in the absence of ice. As ice accumulates the waveguide resonant frequency changes. The actual resonant frequency of the waveguide/ice combination is determined by adjusting the frequency of the controllable oscillator until the meter reads a maximum. Deviations of the controlled oscillator frequency, from the quiescent frequency, indicate the presence of ice, and the quantum of this deviation indicates the thickness of the ice. By calibrating the measurement device, ice thickness can be determined directly from the measurement device.

If desired the measurement device can be augmented by the addition of a rate determining apparatus to indicate the rate of change of the frequency at which the detecting device indicates a peak. The output of the rate indicating circuit will therefore indicate rate of ice growth.

Accordingly, in an open loop embodiment the invention provides:

an ice detection and thickness measurement system comprising:

a controlled oscillator, oscillating at a controllable microwave frequency, a resonant surface waveguide coupled to said controlled oscillator at a feed point, means to mount said waveguide in a location subject to ice accretion, detector means coupled to said surface waveguide at a point displaced from said feed point responsive to microwave electrical energy incident on said detector means, said detector means providing an output indicating microwave electrical energy incident thereon, measurement means coupled to said controlled oscillator for indicating frequency deviations of said controlled oscillator from a predetermined frequency, and control means to control the frequency of oscillations of said controlled oscillator, whereby ice thickness is detected by noting said frequency deviation indicated by said measurement means when said control means controls said frequency of oscillation to produce a maximum detected energy at said detector means.

A second embodiment, described hereinafter, improves on the first open loop embodiment by automating the measurement, so that an observer can monitor an output (for example a typical numeric display) to determine the presence or absence of ice, the thickness of ice, if ice is present, as well as the rate of ice growth. By automating the measurement, the need for an operator to manipulate the frequency of oscillation of the controlled oscillator is eliminated. The instrument includes a waveguide located to have its characteristics varied subject to ice accretion at a measuring location, the waveguide including an input port and an output port. A controllable oscillator is provided with a control input and an output, the output of the controllable oscillator is coupled to the waveguide input port. A sweep means is provided which generates a control signal, which when coupled to the controllable oscillator causes the oscillator to sweep in frequency as a function of time. A detector is coupled to the output port of the waveguide to provide a detection signal with at least one parameter (for example voltage) varying as a function of time and related to the energy received by the detecting means at the output port of the waveguide. A peak detector is provided coupled to the detecting means to generate a peaking signal with recognizable transitions corresponding to predetermined points of the detection signal. Finally, a computing means is provided which is responsive to the peaking signal and to the sweep means (particularly, the control signal of the sweep means) for detecting ice presence and thickness at the measuring location.

In accordance with the second embodiment of the invention, a temperature detector (for example a thermistor) is located adjacent the waveguide and the output of the temperature detector is provided to one input of a comparator, the other input of which is coupled to the control signal of the sweep means. As the control signal sweeps up in voltage it causes a transition to occur in the output of the comparator which is indicative of ambient temperature. In this specific embodiment of the invention, the sweep means provides a pair of adjacent ramp signals, ramping from a first higher voltage down to a lower voltage, and then from the lower voltage back to the higher voltage, at equal but opposite slopes. As a result, the output of the comparator is a pulse, and significantly, one cycle of the comparator output can be used to measure the time base of the sweep (although there may be some negligible error if temperature changes very rapidly). The computing means, thus is capable of determining ambient temperature from the output of the comparator and also determining the time base of the sweep.

The controllable oscillator sweeps from a low frequency to a frequency beyond the ice-free resonant frequency of the waveguide, and back to the low frequency again. As a result the detection signal is substantially symmetric about the point in time at which the slope of the frequency sweep changes. More particularly, since the sweep is arranged to span a range including the resonant frequency of the waveguide (which varies as a function of ice thickness), the detection signal is symmetric about the specified point in time and includes a pair of peaks, each identifying the resonant frequency. The time delay between these peaks is indicative of the resonant frequency, and if different than the time delay between the peaks in an ice-free condition, can be used to determine the resonant frequency and/or the ice thickness.

The output of the detecting means is provided to a peak detector. The peak detector outputs a pulse corresponding to each peak. The width of each of the pulses corresponds to the quality factor (Q) of the waveguide. These two pulses can be considered to embody four transitions. A first, up-going transition ($P_U$) indicating that the output of the detecting means has approached within a specified percentage of the peak, and a second, down-going transition ($P_D$) indicating that the output of the detector has fallen below a specified percentage of the peak. The second pulse includes similar up-going ($Q_U$) and down-going ($Q_D$) transitions corresponding to the second peak, of the pair.

By knowing the slope of the frequency sweep, as well as the maximum frequency in the sweep, the frequency corresponding to the peaks can be determined by noting the time delay between the peaks. Because the output of the detecting means is symmetrical, it can also be shown that the same time delay information can be obtained by noting the delay between the down-going transitions in the pair of pulses.

If we are willing to assume that the time base is relatively fixed (does not change as a function of ambient conditions, aging, etc.) then the time delay information just referred to can be employed along with the ice-free time delay, and the nominal value of the time base, to determine ice thickness. Once ice thickness is determined, one can obtain icing rate by comparing change in ice thickness as a function of time. However, in order to increase the accuracy of the instrument, the output of the comparator can be used to actually measure the time base so that the instrument can track changes in the time base. As indicated above, the comparator outputs a pulse whose up-going and low-going transitions correspond to ambient temperature. One cycle of this waveform, however, indicates the time base. Thus, by making the computing means responsive to the output of the comparator, we can track changes in the time base.

It should be apparent to those skilled in the art that while the sweep means of the preferred embodiment provides an up-sweep and a down-sweep with equal slopes in frequency as a function of time, that is not essential to the invention. Either an up-sweep alone, or a down-sweep alone, so long as it passed through both the ice-free resonant frequency and encompasses sufficient range to provide a meaningful range of measurement of ice thickness for the instrument would suffice. As an alternative to actually measuring the time base of the sweep, the instrument can be changed from open loop to closed loop, so that the computing means actually controlled the sweep. In this case, the time base would not have to be measured, since it was controlled.

Thus, in accordance with the preferred embodiment, the invention provides an instrument for detecting the presence of and measuring the thickness of ice at a measuring location comprising:

a waveguide located to have its characteristics varied subject to ice accretion at said measuring location, said waveguide having an input port and a separate output port, a controllable oscillator with a control input and an output, means connecting said output of said controllable oscillator to said waveguide input port, sweep means connected to said control input to provide a control signal to cause said controllable oscillator to sweep in frequency as a function of time, detecting means connected to said output port to provide a detection signal with at least one parameter varying as a function of time and related to energy received by said detecting means at said output port, peaking means responsive to said detecting means to provide a peaking signal with recognizable transitions corresponding to predetermined points of said detection signal, and computing means responsive to said peaking signal for detecting ice presence and thickness at said measuring location.

While our prior application Ser. No. 337,200, now U.S. Pat. No. 4,470,123 described an apparatus to measure ice thickness at a measuring location in contact with the waveguide, our application Ser. No. 596,340 shows that the measuring location can be displaced from the waveguide so long as waveguide characteristics (resonant frequency) are affected by ice presence and thickness.

As indicated in our prior applications, a single instrument can monitor more than one measuring location. In terms of the present preferred embodiment, such an instrument would include a separate waveguide, controllable oscillator, sweep means, detecting means, and peaking means for each measuring location. A single computer is responsive to the apparatus at each measuring location for measuring ice thickness, rate of ice growth, at each of the measuring locations. The single computer can be arranged to drive a single display which can be manually, or automatically driven with respect to information from any selected measuring location. Alternatively, of course, a separate display can be provided for each measuring location.

The invention also comprehends a method for detecting the presence of, and measuring the thickness of, ice at a measuring location comprising the steps of:

providing a waveguide located to have its electrical characteristics varied, subject to ice accretion at the measuring location, the waveguide being provided with an input port and a separate output port, energizing the waveguide with electrical energy, at its input port, said electrical energy sweeping in frequency as a predetermined function of time, peak detecting energy received at said output port of said waveguide to provide a peaking signal with recognizable transitions corresponding to energy received at said output port of said waveguide, and determining from said recognizable transitions, ice presence and ice thickness at said measuring location.

BRIEF DESCRIPTION OF THE DRAWINGS

The present invention is further described in the following portions of the specification when taken in conjunction with the attached drawings in which like reference characters identify identical apparatus and in which:

FIG. 9 is a schematic for ramp generator 50;

FIG. 10 is a schematic for comparator 58;

FIG. 11 is a schematic of the amplifier 56 and peak detector 57;

DETAILED DESCRIPTION OF THE INVENTION

Figure 1:
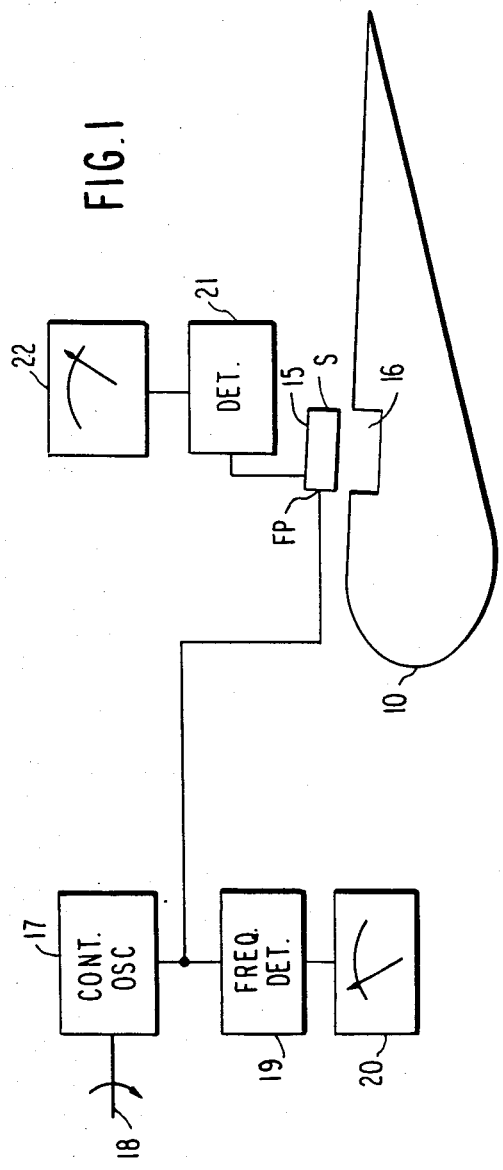
FIG. 1 is a block diagram of a first embodiment of the invention.
Figure 2:
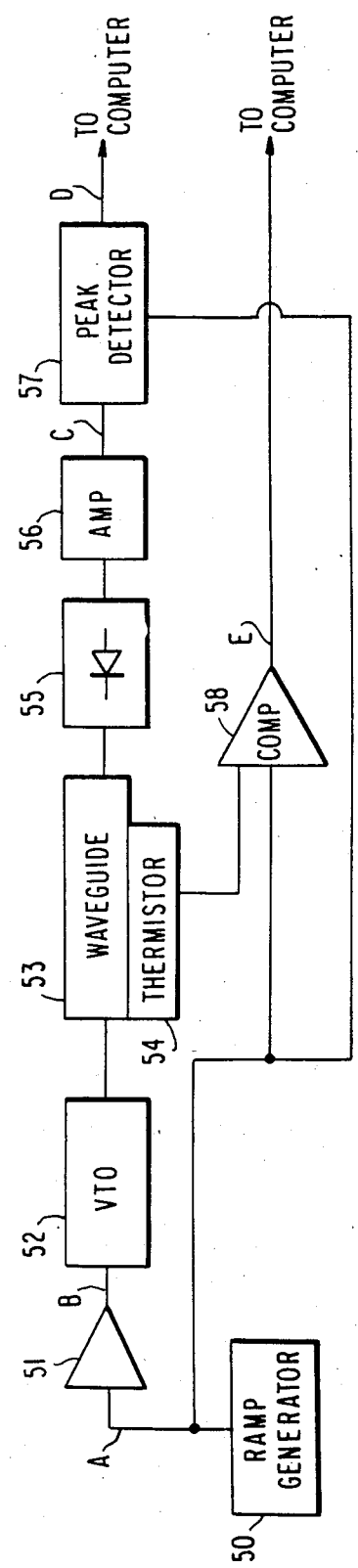
FIG. 2 is a block diagram of a second, preferred embodiment of the invention.
Figure 3:
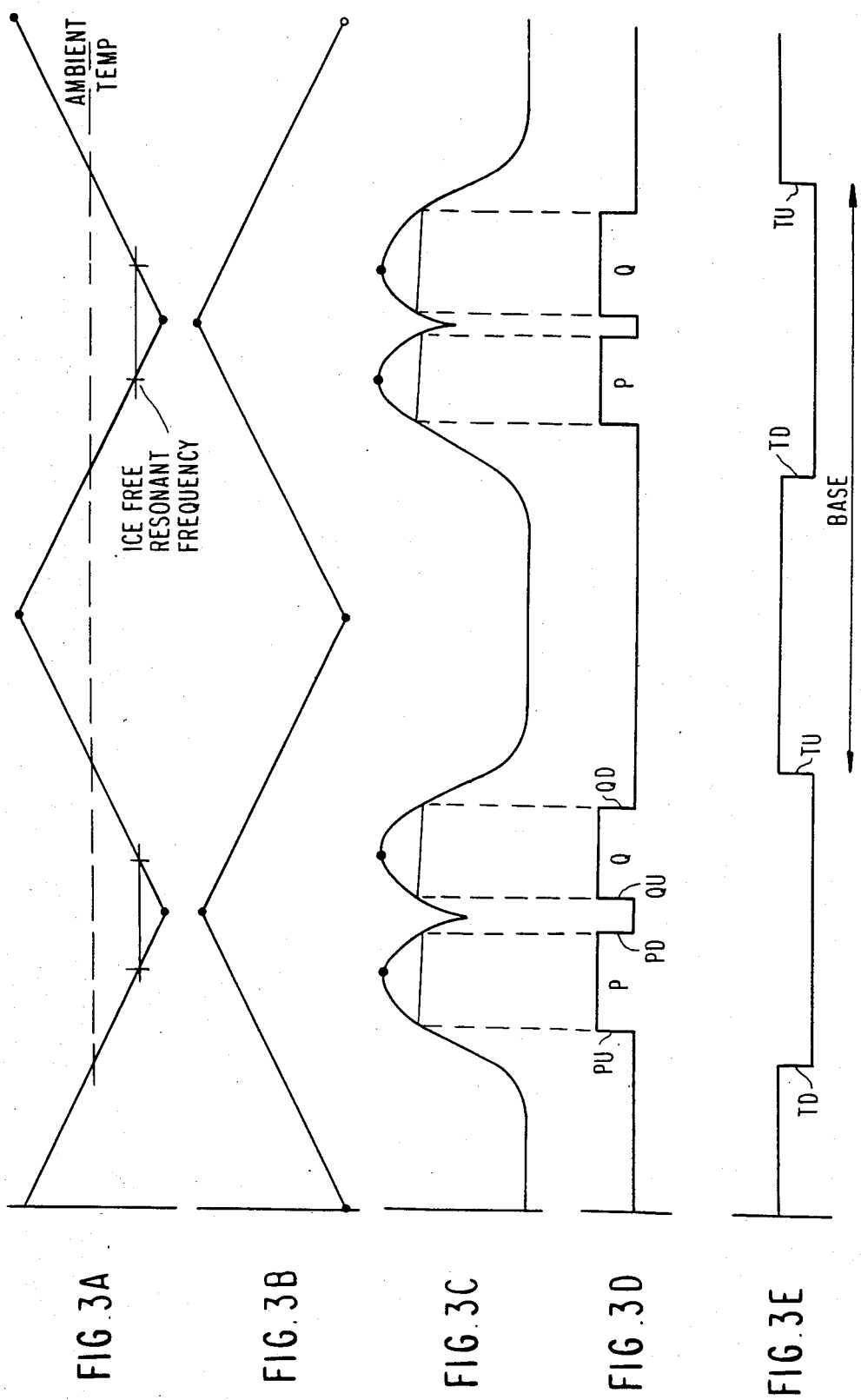
FIGS. 3A-3E illustrate typical waveforms occurring at specified points in the block diagram of FIG. 2.

FIG. 1 is a functional block diagram of an open loop embodiment of the invention which is employed for ice detection and measurement in connection with an air foil 10.

As shown in FIG. 1, the air foil 10 includes a surface waveguide 15, which when inserted into the mating slot 16 in the air foil 10 exhibits a streamline structure. (FIG. 1 is shown schematically, in usual practice, ice grows on leading surfaces and that would be the typical location for the waveguide 15.) The surface waveguide 15 includes a feed point (FP) which is supplied with microwave energy by a controlled oscillator 17. The controlled oscillator 17 is associated with a control means 18 for varying the frequency of oscillation thereof. The controlled oscillator 17 is arranged to oscillate at a predetermined, fixed or quiescent frequency $f_{00}$ and at other times at a frequency of oscillation $f_0$ which is different from $f_{00}$ as controlled by the manipulated shaft 18. The frequency of oscillation of the controlled oscillator 17 is detected by a frequency detector 19 which has an input coupled to the output of the controlled oscillator 17, and an output coupled to a conventional meter or other frequency indicating device 20. In a preferred embodiment, the meter 20 is arranged to indicate deviations in the frequency $f_0$ of the controlled oscillator 17 from the frequency $f_{00}$. As will be more clearly explained in subsequent portions of this specification, the meter 20 may be calibrated in terms of ice thickness.

Also associated with the waveguide 15 is a detector 21. As is indicated in FIG. 1, the detector 21 is coupled to the waveguide 15 at a point separated from the feed point FP, and thus the waveguide 15 operates in a transmission mode in that energy detected by the detector 21 is energy which is transmitted through the waveguide 15. The waveguide 15 is shorted, such as by the use of the short S, also indicated in FIG. 1. The waveguide 15 is arranged to be resonant at the frequency $f_{00}$ when mated with the air foil 10. To present a streamlined appearance the waveguide 15 includes an air foil surface to mate with the air foil 10. The detector 21 is coupled to another conventional display such as the meter 22. The meter 22 is deflected in relation to the energy detected by the detector 21.

In normal operation, with the waveguide 15 installed in the air foil 10, the controlled oscillator produces an output at the quiescent frequency of oscillation $f_{00}$ which is coupled to the waveguide 15. The energy is detected by the detector 21 and indicated by the meter 22. In the event that ice forms on the surface of the surface waveguide 15, the electrical characteristics of the waveguide changes, and more particularly its resonant frequency changes. As a result, in the absence of a change in the frequency of oscillation of the controlled oscillator 17, the waveguide 15 no longer receives energy at its resonant frequency. In this off resonant condition, the energy intercepted by the detector 21 decreases, and the meter 22 reflects this condition.

An observer, observing the drop in the reading of the meter 22 can manipulate the shaft 18 to lower the frequency of the controlled oscillator 17. Lowering the frequency of the controlled oscillator increases the wave length of the energy in the waveguide 15, to compensate for the change in electrical characteristics caused by the ice accretion on the surface of the waveguide 15. As the frequency of the controlled oscillator 17 approaches the new resonant frequency of the waveguide 15, the energy incident on the detector 21 increases and the meter 22 reflects this fact. As the frequency of oscillation passes beyond the resonant frequency of the waveguide 15, the energy intercepted by the detector 21 again falls, reflected by movement of the needle on the meter 22. The observer can then, by reversing the rotation of the shaft 18, bring the meter 22 to a maximum. During this manipulation of the shaft 18, the frequency detector 19 is continually detecting frequency deviations from the frequency $f_{00}$. Once the meter 22 has again been placed in a maximum condition, the observer can note the condition of the meter 20 indicating the frequency deviation ($f_{00}-f_0$), preferably with the meter 20 calibrated for the dimensions of the waveguide 15 and the frequency $f_{00}$, the ice thickness can be read directly off the meter 20.

FIGS. 2-8 relate to a second, preferred embodiment of the invention which, while open loop, automatically effects the measurement and produces the resulting information to an observer.

A ramp generator 50 produces a voltage varying with time as shown in FIG. 3A. More particularly, the voltage decreases, at a constant rate from a first voltage to a second voltage, and then the slope reverses and the voltage rises at the same rate back to the first voltage. This waveform repeats as a function of time. The output of the ramp generator 50 is coupled to a VTO driver 51 and to a comparator 58. The VTO driver 51 amplifies, offsets and inverts the waveform, so that the output of the VTO driver 51 is as shown in FIG. 3B.

The VTO 52 produces an output whose frequency is related to its input voltage, and therefore a plot of frequency vs. time would be identical to FIG. 3B aside from VTO non-linearities.

The waveguide 53 is constructed and located as is described in our application Ser. No. 337,200 now U.S. Pat. No. 4,470,123. Co-located with the waveguide 53, is a thermistor 54 such as OMEGA 47005. The thermistor 54 provides a voltage varying as a function of ambient temperature, and this output is coupled as the other input to the comparator 58.

As has been described in our parent application Ser. No. 337,200 now U.S. Pat. No. 4,470,123, the waveguide 53 is purposely arranged to be resonant, in an ice-free condition, at some frequency within the range swept by the VTO 52 as a result of its driving voltage. Since ice growth reduces the resonant frequency of the waveguide, preferably the ice-free resonant frequency is at or near the upper limit of the frequency sweep. We have shown, in FIG. 3A, that voltage of the ramp generator 50 which corresponds to the ice-free resonant frequency. Likewise, the thermistor 54 is chosen such that its output voltage for a practical temperature range lies somewhere within the voltage range of the ramp generator 50. Thus, FIG. 3A also shows a typical ambient temperature voltage, that voltage produced by the thermistor 54 at an ambient temperature within the typical operating range.

As the frequency of the energy imposed on the waveguide 53 by the VTO 52 varies, the voltage sensed by the detector 55 will also vary. As the frequency of the energy reaches the resonant frequency of the waveguide, the voltage will peak. Because the frequency sweep is from below a resonant frequency to above the resonant frequency and back again, there will be two peaks, substantially symmetrically located about the point in time at which the slope of the frequency sweep changes. The output of the detector 55 is amplified by the amplifier 56, and its output is shown in FIG. 3C. As shown in FIG. 3C, for each sweep, the output of the amplifier 56 is doubly peaked with a relative minimum at that point in time at which the frequency sweep changes slope. The output of the amplifier 56 is provided as an input to the peak detector 57. The peak detector 57 is arranged so as to provide an output transition when the input crosses a threshold which is a specified percentage of the preceding peak value. As indicated in FIG. 3C, the rising threshold is slightly above the falling threshold. Accordingly, and as is shown in FIG. 3D, the output of the peak detector 57 is a pair of pulses including four transitions, the pulses are denoted P and Q, and thus there are transitions $P_U$, $P_D$, $Q_U$, $Q_D$.

The output of the comparator 58, on the other hand, exhibits a negative going transition $T_D$ when the control signal from the ramp generator 50 falls below the ambient temperature, and likewise an up-going transition, $T_U$ wherein the rising voltage from the ramp generator 50 passes through the ambient temperature. Finally, the time base of the sweep can be determined by measuring the delay between any particular up-going transition $T_U$, and the previous occurrence of the identical transition, as shown in FIG. 3E.

Figure 4:
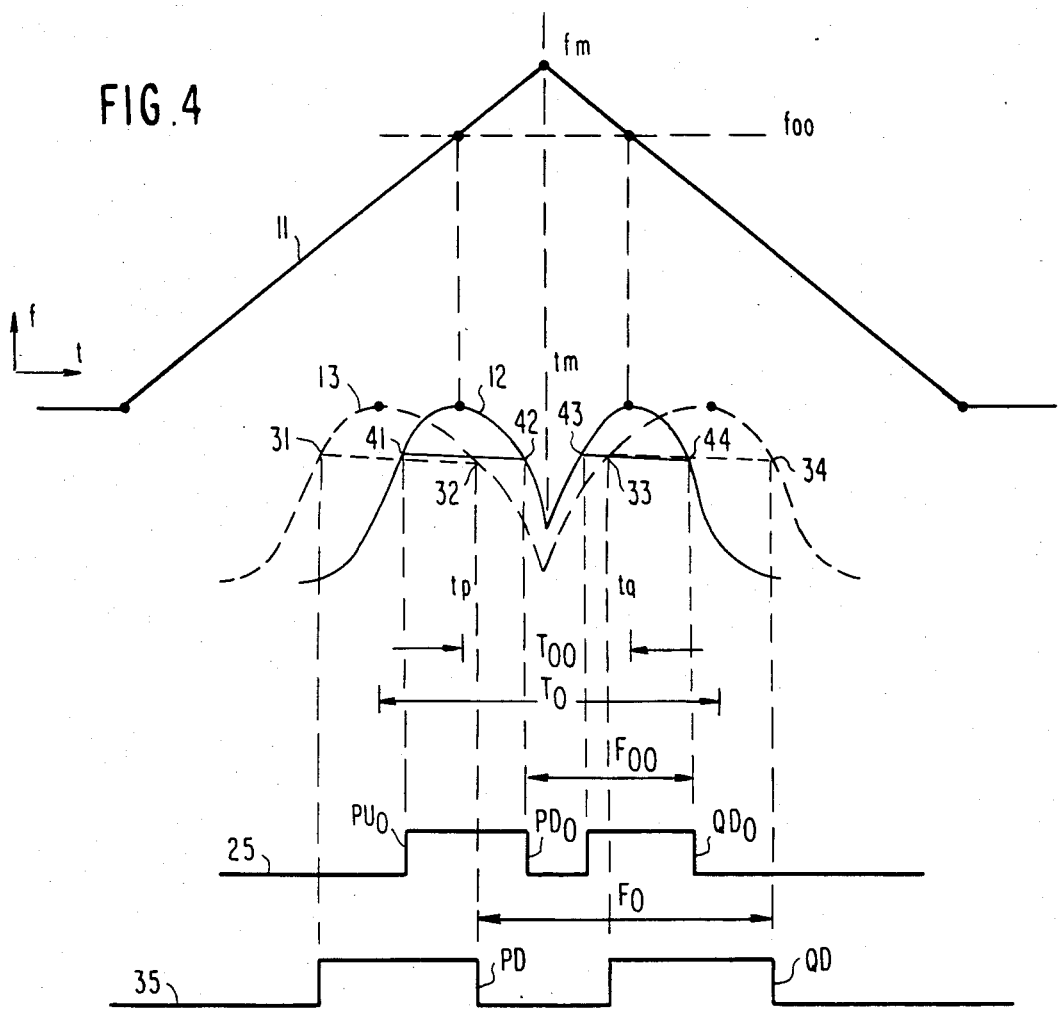
FIG. 4 illustrates a typical frequency sweep, the corresponding output of the detector for different icing conditions and the corresponding output of the peak detector.

FIG. 4 illustrates in curve 11 the frequency sweep, as a function of time. Curve 12 illustrates the output of the detector 55 under ice-free conditions. More particularly, under these conditions the waveguide 53 is resonant at the frequency $f_{00}$, and thus the peaks of the curve 12 occur at a point in time corresponding to that point in time when the frequency sweep passes through the frequency $f_{00}$. By knowing the slope of the frequency sweep, as well as the maximum frequency $f_m$ and the delay $T_{00}$ between the peaks, we can determine the frequency $f_{00}$. Although this parameter can be predetermined, it can also be measured and recorded for later use.

As icing occurs, the resonant frequency of the waveguide 53 falls and thus, for example, under typical conditions when ice is present, the output of the detector 55 will take the form of curve 13, wherein the peaks have moved out from their quiescent condition, the delay $T_0$ between the peaks is now increased above $T_{00}$. The differdnce $T_0-T_{00}$ is a measure of the difference between the frequency $f_0$ and the ice-free resonant frequency, $f_{00}$.

This change in the output of the detector 55 is reflected in a change in the output of the peak detector 57. More particularly, curve 25 illustrates the output of the peak detector 57 under ice-free conditions. As shown, there is an up-going transition $P_{UO}$ when the output of the amplifier 56 exceeds a specified threshold, indicated at 41. Likewise, there is a down-going transition $P_{DO}$ when the output of the amplifier 56 decreases below a specified threshold indicated at 42. Similar transitions for the Q pulse ($Q_{UO}$ and $Q_{DO}$) correspond to thresholds 43 and 44, respectively. The delay $F_{00}$ between the two down-going transitions ($Q_{DO}-P_{DO}$) corresponds to the ice-free resonant frequency, $f_{00}$. This property is a function of the symmetrical form of the peaks relative to the point of symmetry at which the frequency sweep changes slope.

More particularly, we can write that the time delay between $Q_U$ ($t_{43}$) and maximum frequency ($t_M$) is slightly less than the time delay between $t_M$ and $P_D$ ($t_{42}$). Thus, $t_{43} - t_M < t_M - t_{42}$. But the time delay between $P_U$ ($t_{41}$) and the actual peak ($t_P$) is about the same as the delay between $Q_U$ ($t_{43}$) and the second peak ($t_Q$). That is:

$$t_P - t_{41} \cong t_Q - t_{43},$$

and likewise:

$$t_{42} - t_P \cong t_{44} - t_Q.$$

Also $$t_{42} - t_{41} \cong t_{44} - t_{43}.$$

$$t_P - t_Q = t_{43} - t_{41} = t_{42} - t_{44}.$$

Thus by timing the delay $t_{42}$ to $t_{44}$ ($P_D - Q_D$), we can measure the delay $t_Q - t_P$. If that is different from $T_{00}$, the difference can be used to determine $f_0$, and from $f_{00} - f_0$, the ice thickness.

The output of the detector 57 under icing conditions is illustrated in curve 35. As shown in curve 35, the pair of pulses has now moved apart, the transitions corresponding to threshold points 31, 32, 33 and 34. The delay $F_0$ (between $Q_D$ and $P_D$) corresponds to the resonant frequency of the waveguide under icing conditions. The difference ($F_0 - F_{00}$) thus corresponds to the frequency change from ice-free to icing conditions. The waveguide parameters and the range of the frequency sweep is arranged so that the change in delay ($F_0 - F_{00}$) is a nearly logarithmic function of ice thickness.

While the thresholds (41-44 and 31-34) could be equal, in practice we have required the rising threshold to be slightly higher than the falling threshold, e.g. 41, 43, 31 and 33 are identical and each slightly higher than 42, 44, 32 and 34.

Figure 6:
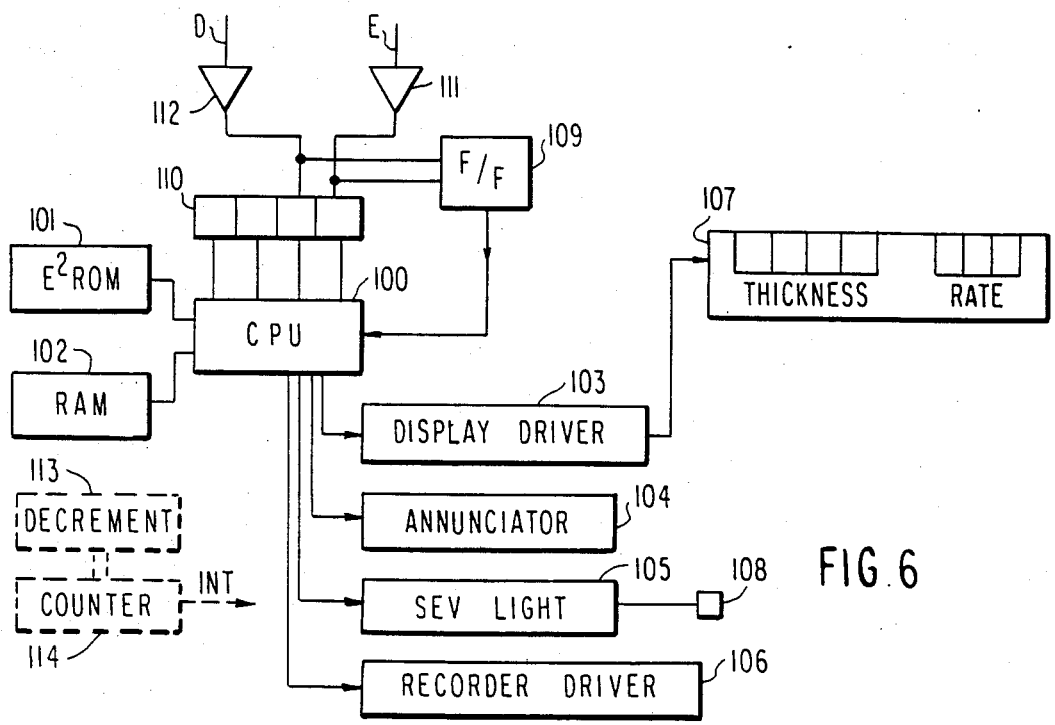
FIG. 6 is a block diagram of the computer referred to in FIG. 2.

FIG. 6 shows a block diagram of the computer device, which in an embodiment of the invention includes a TI TMS9995.

More particularly, and as shown in FIG. 6, the CPU module includes a pair of amplifiers 111 and 112 for respectively driving a receiver register 110. The register 110 includes a different stage for each of the driver amplifiers the inputs of the driver amplifiers are coupled to the outputs of the comparator 58 and peak detector 57, respectively. Accordingly, the voltages in the corresponding stages of the register 110 reflect the output of the comparator 58 and peak detector 57 and therefore a time sequence of states of the register follows the transition of FIGS. 3E and 3D. A flip-flop 109 has inputs coupled to the outputs of the amplifiers 111 and 112, and thus the flip-flop changes state for each transition in the curves of FIG. 3D or 3E. The output of the flip-flop 109 is provided as an interrupt input to the CPU 100. The CPU 100 is associated with E²ROM 101 and RAM 102. Outputs from the CPU 100 are provided to a display driver 103, an annunciator 104, a severity light 105, and a recorder driver 106. The annunciator 104 merely indicates the presence of ice, as is explained hereinafter. The display driver 103 provides two numerical quantities to a display 107. A first numerical quantity indicates ice thickness, and a second nunerical quantity indicates the rate of ice growth. The display driver 107 includes a conventional multi-element numerical display for displaying each of these parameters. The severity light 105 driver drives a LED 108. The LED 108 is lit or energized when the icing rate is increasing (the second derivative of icing thickness with respect to time) and under other circumstances is dark. A recorder driver 106 is provided so that an instrument recorder can be driven from the CPU 100.

The CPU 100, in order to compute the required information, must be capable of identifying the pertinent time delays. The outputs of the amplifiers 111 and 112 exhibit transitions, beginning and ending these time delays. The CPU 100 includes a decrementer 113 driving a counter 114. When the counter 114 overflows, it interrupts the CPU 100 to update a clock maintained in writable memory. When the clock overflows, it is reset and increments a calendar, also in writable memory. The counter 114 overflows every 0.0875 seconds, the clock overflows every 1.5929 hours. Thus, periodically the interrupt requires the CPU 100 to service the clock, e.g. update the writable memory. At all times, the counter 114 provides present time information to the CPU 100.

The interrupt provided by the flip-flop 109 indicates a transition in one of the signals from the peak detector 57 or comparator 58. Before the significance of this transition can be determined, logic is required to identify which transition has taken place. This identification must be accomplished using only the present state of these signals and the past history of the same signals. Reference to FIGS. 3D and 3E indicate that the signal transitions occur in a cyclic progression, and thus the event indicated by one of these transitions can be determined by tracking the signal states.

Figure 8:
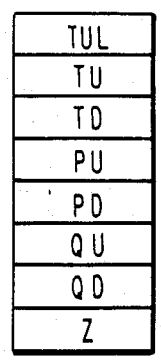
FIG. 8 illustrates a data register contained within the computer of FIG. 6.

The CPU 100 maintains a multi-byte data register shown in FIG. 8. Ihe multi-byte data register of FIG. 8 includes eight entry locations. The locations TU, TD, PU, PD, QU and QD should require no further comment, since they correspond to the six transitions in the signals shown in FIGS. 3D and 3E. The element TUL corresponds to the last (not the present) up-going transition in the temperature signal. The purpose of the Z element will be described hereinafter.

Once the CPU 100 identifies a particular event (in a manner to be explained), it loads data representing that event, e.g. the state of the counter 114, in the appropriate location in the data register. Once all data elements have been loaded, then computing can proceed. Accordingly, if all the data elements are loaded then a flag is set to indicate the necessity for computation. When the CPU 100 identifies the presence of the flag, the data is processed to produce output data for driving the displays. While the CPU is reading the DR registers, data can be accumulated in another register DR'. The use of these registers switches from cycle to cycle.

Figure 5A:
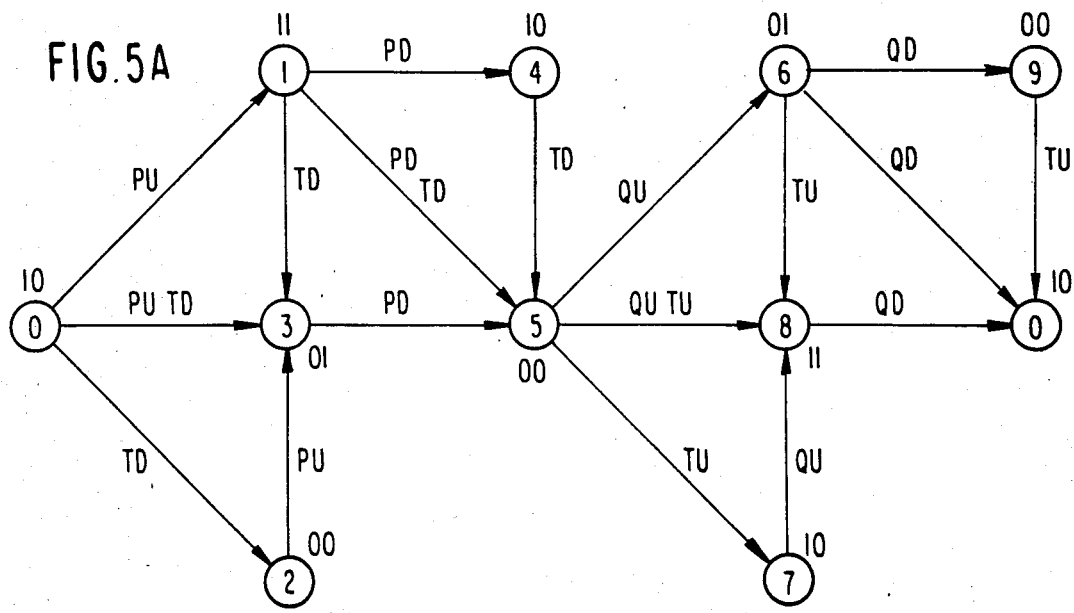
FIG. 5A is a state transition diagram and FIG. 5B is a state transition table useful in explaining operation of the computing means.
Figures 5B, 5C:
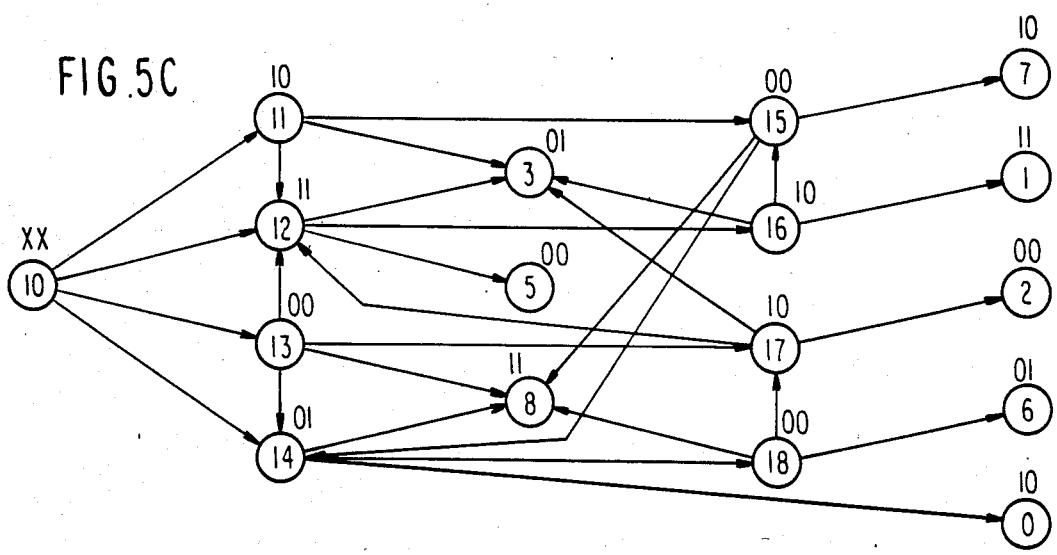
FIG. 5C is a state transition diagram particularly for the lead in condition and useful in explaining operation of the computing means.

In order to explain how the CPU 100 identifies the particular event, reference is now made to FIGS. 5A and 5B.

As indicated above, there are six different transitions to be detected. This thus represents six different states. In addition, the transition $T_D$ can occur simultaneously with either $P_D$ or $Q_D$, thus providing for two additional states. Likewise, the transition $T_U$ can occur simultaneous with $P_U$ or $Q_U$, providing for an additional two states, for a total of ten different states. These states have been arbitrarily identified as states 0 through 9, and FIG. 5A is a state transition diagram. The reference characters within the circled locations identify the different states, 0–9. The two-bit binary representation associated with each circled reference character identifies the level. The progression through the cycle is identified by the state of the outputs of the amplifiers 111 and 112; there are four different levels, 00, 01, 10 and 11 corresponding to E and D down (00), E down, D up (01), E up, D down (10) and E and D up (11). State 0 is identified with level 10, that is the output of the peak detector 57 is low and the output of the comparator 58 is high. Three different transitions are available from state 0 to either states 1, 2 or 3. These are identified in FIG. 5A, and the particular signal transition linking these four states is identified. From states 1, 2 or 3, the cycle can progress to either state 4 or 5, and likewise, the particular transitions between states 1–3 and 4–5 is illustrated. From state 5 it is possible to progress to any of states 6–8, and the particular transitions linking states 5 and 6–8 are also identified. From state 8, only a single transition is available to state 0, and from state 6 two transitions are available to either state 9 or 0, and finally from state 9 only a single transition is available to state 0. FIG. 5B shows similar information in a table. The first column in the table is labelled "From State". The remaining columns are labelled Level 0 through 3, corresponding respectively to levels 00, 01, 10 and 11. Thus, rows 0–9 of the table of FIG. 5B reproduce the information in FIG. 5A. Accordingly, either FIG. 5A or rows 0–9 of FIG. 5B show how the CPU 100 can track the measurement cycle through the progression, once the CPU 100 identifies the starting state. It should be apparent, however, that this information is inadequate to identify any particular transition if we begin at an unidentified state, and as the instrument is turned on or enabled, it will be in an unidentified state. Accordingly, rows 10–18 of FIG. 5B and FIG. 5C identify the "lead in" process from an unidentified state to some specified state. Thus, as shown in FIG. 5C, state 10 is arbitrary (the level is immaterial). FIG. 5C and rows 10–18 identify a sequence beginning at some unidentified state 10 which leads via states of different levels to one of the identified states (0–9) of FIG. 5A. As is the case with FIG. 5A, the binary numerals adjacent each state identify the level of the peak and temperature signals at the state.

Referring again to FIG. 5B, it will be noted that there are some blank locations in the transition table. The blank locations identify invalid transitions. For example, referring to row 0 which is entered when level 2 is detected) there is no valid transition to level 2. Similarly, from state 1 there is no valid transition to level 3, since state 1 is level 3. In the event the CPU 100 identifies a transition as an invalid transition, then a spurious transition has been identified and actually no valid data should be based on the particular cycle. Accordingly, under those circumstances, the contents of the counter 114 are loaded into the Z element. When it is determined that the data register is full, and there is an entry in the Z register then the CPU 100 will, firstly, abort the cycle, ignore the data, and secondly begin a new lead in process.

Similarly, assuming the CPU 100 has terminated the lead in process and is now in normal processing, if a state transition is made to any of states 11–14, then a new lead in process will be begun, the measuring cycle will be aborted, and the data maintained in the data register at that point in time will be ignored. Once in normal processing, a transition to a state above 9 indicates a malfunction.

Figure 7:
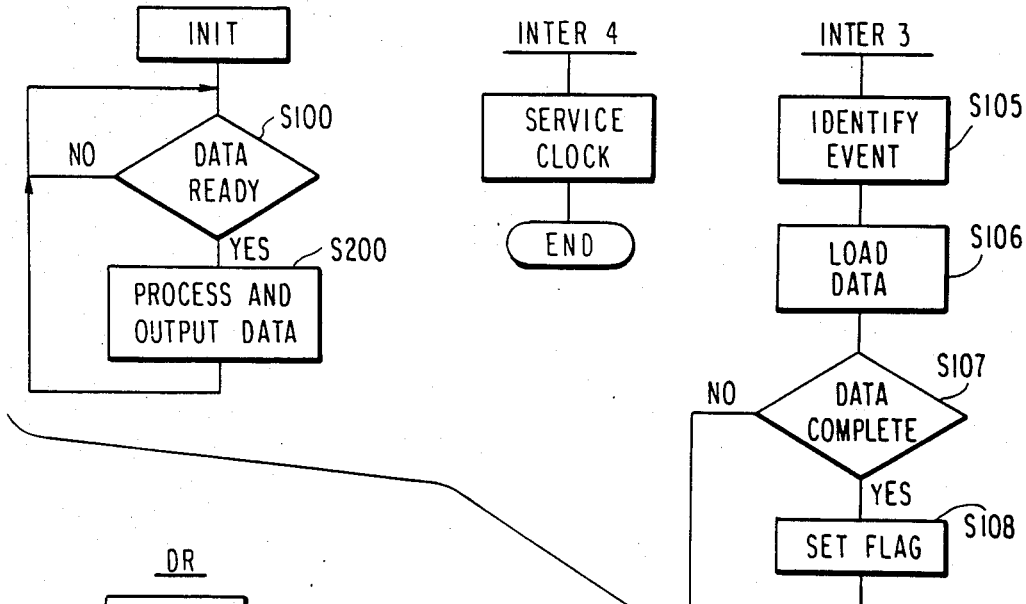
FIG. 7 illustrates typical processing carried out by the computer.

Accordingly, and now referring to FIG. 7, the main program flow includes basically two steps, after the initialization process. Step S100 determines whether data is ready. This merely requires reference to the flag which has already been mentioned. Assuming data is not ready, then the main flow loops until data is ready. When data is ready, then step S200 is performed. Step S200 takes the data which has been passed (from the data register) and determines ice thickness, and using the new value of ice thickness, and several preceding values, updates the icing growth rate. By comparing several icing growth rate measurements, the processing step S200 also determines if the growth rate is increasing or decreasing.

The main program flow can be interrupted by interrupt 4 for servicing the clock, or by interrupt 3 for loading the data register. Referring now to interrupt 3, the first step, S105 identifies the event causing the interrupt. A transition in E or D results in an interrupt. Step S105 is implemented using the state transition table of FIG. 5B, as well as the present state of the register 110, identifying the level. From the present state and the level, the new state is readily determined. The new state is used to update the present state and for identifying the event. For example, and referring to FIG. 5A, a transition from state 0 to state 1 is initiated by a transition in $P_U$. This identifies the event and therefore the present contents of the counter 114 is loaded into the PU element of the data register DR. Likewise, the transition from state 5 to state 8 is caused by the simultaneous transitions in $Q_U$ and $T_U$. Accordingly, under these circumstances the present state of the counter 114 is loaded into the TU and QU elements of the data register. Once the event has been identified, the data is loaded in response to step S106. Step S107 determines if data is complete (aside from the Z element). If we have not yet completed the cycle, each element is not filled. On the other hand, on detecting a new state 0, then we set the flag, (step S108) and return since state 0 terminates a cycle.

In processing the data, step S200 first looks to see if the Z element in the register has a non-zero quantity. If that is the case, then a spurious interrupt or some impossible sequence event has been identified, the flag S108 is reset, and no computation is made. On the other hand, of the Z element contains a zero quantity, then the data is extracted. At the same time, the present quantity TU is loaded into the TUL element of the other data register (DR'). Since it takes some finite time for the step S200 to begin processing the data, we actually employ two data registers (DR and DR'), so that while one is being filled, the other can be processed, and vice versa.

In processing the data, we first compute the time base for the sweep. This is computed by obtaining the difference between TUL and TU.

Thereafter, the quantity $F_0$ is determined by computing the delay between QD and PD. We then obtain the ratio of delay to the base ((PD−QD)/BASE). This maintains accuracy notwithstanding variations in the time base. One might assume that the delay would be computed by determining QD−PD. In the embodiment of the invention actually constructed, however, the counter 114 counts down and therefore a smaller number indicates a later event in time. Therefore, the difference is determined by PD−QD, to give us a positive difference. This ratio is an indication of the resonant frequency of the waveguide. What we want, however, is the difference between the resonant frequency of the waveguide and the ice-free resonant frequency. The ice-free resonant frequency can either be measured by the instrument in a known non-icing condition and stored during operation, or it can be predetermined. For convenience, we identify the ice-free resonant frequency as (PD0−QD0)/BASE0. Thus, to obtain an indication of the shift in resonant frequency, we determine the difference, that is (PD−QD)/BASE−(PD0−QD0)/BASE0.

Part of the data maintained in the E$^2$ROM 101 is a table correlating this time delay variation as a function of ice thickness. Thus, we use the result of the computation as an address into the table. We also interpolate between table values using a simple linear interpolation.

FIG. 9 is a detailed schematic of the ramp generator 50. As shown in FIG. 9, the ramp generator includes a pair of level detectors IC3c and IC3d, and an integrator IC2a. The integrator IC2a produces a positive slope signal in response to R42 being grounded, or a negative slope in response to R42 and R37 being connected to a positive supply by IC3d. The two comparators comprise a flip-flop. The flip-flop switches when the output of the integrator IC2a reaches a level of the output of IC3c. Switching the flip-flop reverses the slope of its output. IC2b is an inverting amplifier whose output is in the form required by the VTO for a tuning voltage sweep. The gain of the amplifier can be controlled by changing the value of R45. R43 and R44 bias the amplifier so that its output is balanced about ground when the gain is set to a maximum.

In addition to the tuning voltage sweep provided by the components just referred to, a voltage doubler is provided to generate a base on which the tuning voltage is imposed. The base is a DC level on which the sweep is superimposed. To generate this DC voltage an oscillator, a regulated driver, and a voltage doubler rectifier are used. IC4a and its associated circuitry oscillates at 50 KHz. The voltage across C10 is a triangular wave, as indicated. The output of IC4a follows the positive slope of the voltage on C10 but falls to a negative voltage during the negative slope. The output of IC4b is negative during negative slope and is positive for a fraction of the positive slope. The exact fraction is determined by a voltage on the positive input to IC4b. The voltage doubler at the output of IC4b (CR6, CR7, and C11, C12) charges C12. The voltage on C12 is fed back to IC4b by R56 and R57 to control the duty cycle of the positive output of IC4b thus regulating the voltage on C12. CR8 and C8 provide for AC coupling the output of the inverter IC2b to the output of the voltage doubler.

FIG. 10 illustrates a schematic for the comparator 58 and the associated circuitry. More particularly, as is shown, there are three connections to a thermistor such as an Omega 44005. If R31 and R32 are correctly chosen, the 44211A linear thermistor may also be used. IC2c is used to provide a negative reference. R31 and R32 are selected so that the temperature will be linear near 0° C. and to scale the output.

The thermistor signal provides the negative input to the comparator IC58. The positive input is supplied from the ramp generator. The output of IC58 is coupled through FET 58 as the E input for the computer. The E input to the computer makes a low to high transition when the positive ramp of the triangular wave reaches the output voltage of the temperature measuring amplifiers (what has been referred to as the transition $T_U$).

Finally, FIG. 11 is a schematic of the amplifier 56 and peak detector 57. The first two stages IC5 and IC6 are similar to each other and each have gains of approximately 100. R9 and R7 determine the gain of the first stage. The principle difference between the stages IC5 and IC6 is the presence of CR3 in the second stage. This decouples negative going portions of the output from the load and from the AC feedback resistor R10. Accordingly, IC6 charges C3 with its full open loop gain until virtually all of the output signal is equal to a positive with respect to ground. The capacitors C2 and C3 are polarized.

The amplified output has a positive peak stored in the peak storage circuit comprising IC7. Capacitor C4 is charged through CR5. IC8 is used as a voltage follower to make available the capacitive voltage without discharging it.

The comparator IC9 and FET 9 produces the D signal to the computer. The D signal is high when the peak storage circuit is less than 70% of peak voltage, and goes low when the output of IC6 falls to 80% of the voltage stored on C4. This indicates that the peak has passed.

The waveguide 15 will comprise a dielectric of polyethelene or polyethyl sulphone of dimensions 0.5"×4.55'"×5.129" encased in aluminum with a slot in one surface. For the waveguide, the frequency sweep will range from 878–939 MHz. For the described parameters of the waveguide, the ice thickness table, stored in the CPU, is 34 entries long (from table index 0-33) and indicates for each index a corresponding ice thickness from 0 to 1401 mils. A copy of the table is reproduced below.

| Ice Thickness Table | |
|---|---|
| Index | Thickness (in mils) |
| 0 | 0 |
| 1 | 12 |
| 2 | 27 |
| 3 | 37 |
| 4 | 50 |
| 5 | 63 |
| 6 | 77 |
| 7 | 92 |
| 8 | 107 |
| 9 | 122 |
| 10 | 138 |
| 11 | 155 |
| 12 | 173 |
| 13 | 191 |
| 14 | 211 |
| 15 | 231 |
| 16 | 253 |
| 17 | 275 |
| 18 | 299 |
| 19 | 325 |
| 20 | 353 |
| 21 | 382 |
| 22 | 414 |
| 23 | 448 |
| 24 | 486 |
| 25 | 528 |
| 26 | 575 |
| 27 | 628 |
| 28 | 689 |
| 29 | 762 |
| 30 | 850 |
| 31 | 964 |
| 32 | 1126 |
| 33 | 1401 |

Figure 12:
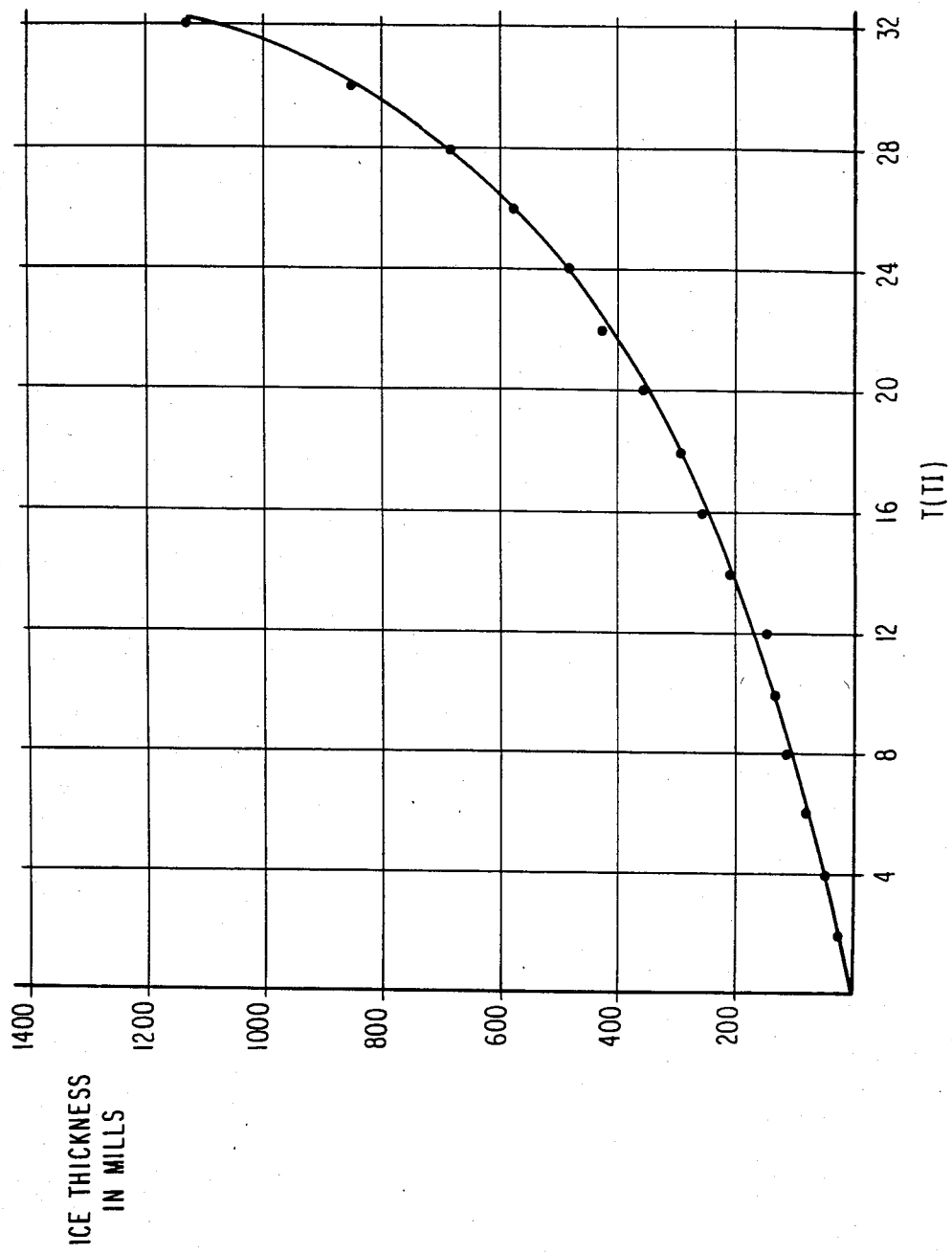
FIG. 12 graphs ice thickness vs. table index.
Figure 13:
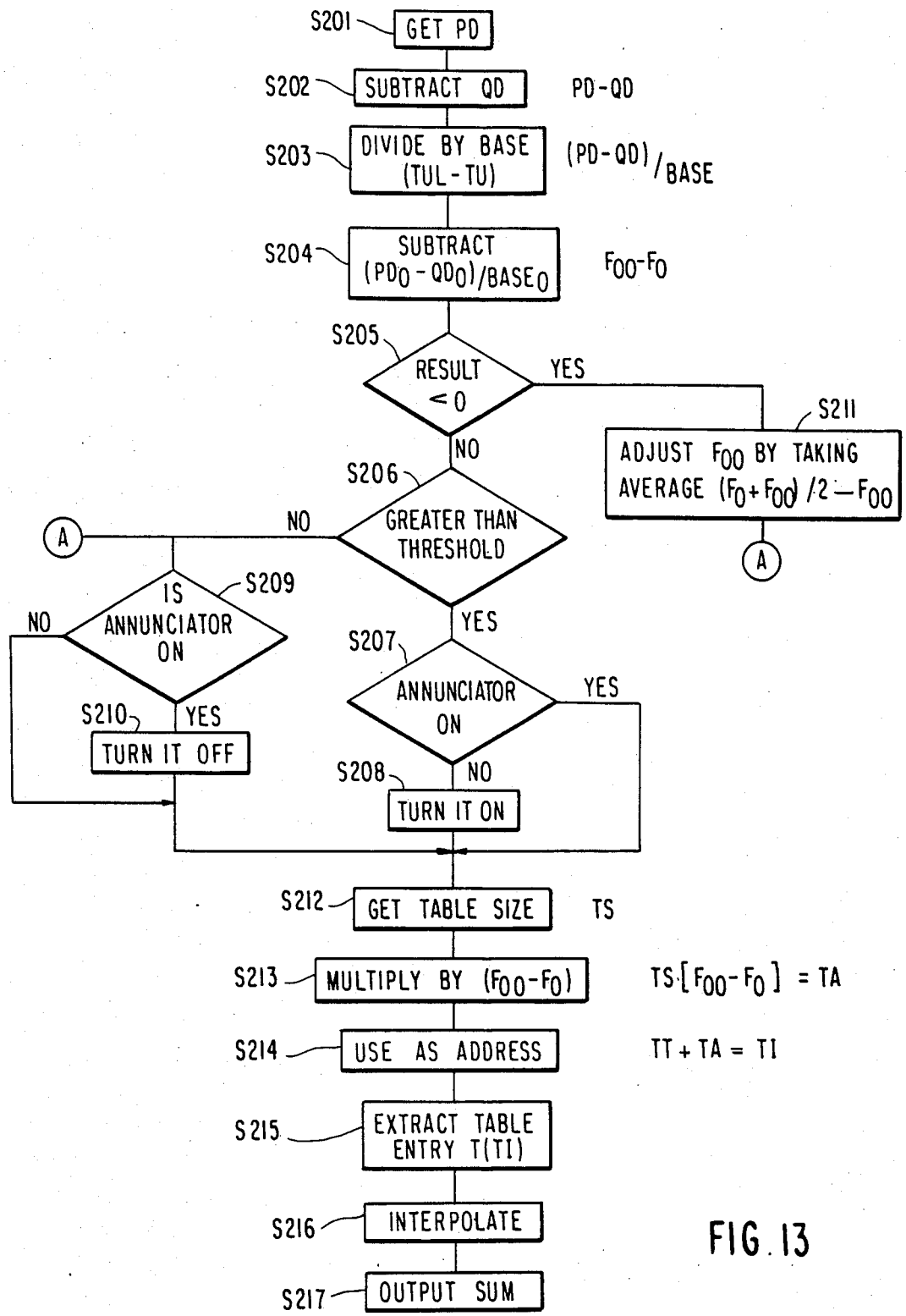
FIG. 13 shows the detail processing steps in determining ice thickness.

For the readers convenience, FIG. 12 graphs ice thickness as a function of the table entry. Over a large region of the table, ice thickness is an almost linear function of table index. The departure from piecewise linear is no more than 0.1%. Partly for this reason, we incorporate a linear interpolation. FIG. 13 is a flow diagram of the portion of the proceessing which computes ice thickness. The steps shown in FIG. 13 are entered once the data derived has been validated, e.g. no spurious transitions have been detected. As shown in FIG. 13 the first step, S201, obtains the quantity PD. Step S202 subtracts the quantity QD, to produce PD−QD. Step S203 divides this difference by the time base (TUL−TU). From this ratio we subtract the present estimate of the ice-free resonant frequency ratio (updated in a mannar to be explained). More particularly, S204 subtracts, from (PD−QD)/BASE, the quantity (PD0−QD0)/BASE0, this corresponds to determining the change in resonant frequency ($F_0 - F_{00}$). Step S205 tests to see if the result is less than zero. Because the quiescent resonant frequency, or our estimate of the quiescent resonant frequency ($F_{00}$) may change as a function of temperature, the result of step S205 could be negative. This is merely an indication that our present estimate of $F_{00}$ is too high ($f_{00}$ is too low). Accordingly, in that event step S211 adjusts our present estimate of $F_{00}$ by averaging our present estimate of the sum $F_{00}$ with $F_{00}$ and using the result as the new estimate of $F_{00}$. Processing then skips to step S209. There we determine if the annunciator is presently on. If it is, then step S210 turns it off.

On the other hand, if the result of step S205 is positive, then step S206 compares the result with a threshold. The threshold we use is an arbitrary threshold indicating approximately 5 mils of ice. If the difference (determined at S204) is less than the threshold then steps S209 and following are performed. On the other hand, if the quantity of ice we have detected exceeds the threshold then step S207 tests to see if the annunciator is on. If it is not, step S208 turns it on.

Steps S212-S217 are the output steps of converting the new resonant frequency ($F_0$) to an ice thickness. Step S212 obtains the table size. Step S213 multiplies the table size by the estimate of $F_0$ to obtain a quantity TA. Step S214 converts TA to use it as an address, one component of this conversion is adding the address of the top of the table to give us a table index TI. With the table index, we can now extract the table entry T(TI) step 215. Normally, the computed quantity TI will fall somewhere between table indices, and therefore step S216 performs an interpolation. Step S217 then outputs the sum of the result of steps S215 and S216 as our present estimate of ice thickness.

The further processing to actually drive the numerical display with the numerical quantity produced in step S217, and furthermore, from a sequence of such numerical quantities to obtain both a rate of ice growth (the change in ice thickness is a function of time) as well as the second derivative of ice thickness with respect to time, should be well within ordinary skill and not require further description. We output the former quantity (rate of ice thickness growth) as a numerical quantity for observation. The latter quantity (the second derivative ice thickness as a function of time) is merely computed to determine whether it is positive or negative. If it is positive, then we energize the severity LED 108. This can be used by a pilot to select the best path out of the icing condition. If he chooses a flight path which results in energization of LED 108, he is informed that he should choose another path.

In addition to using the TU parameter to determine the time base, we also use the present TU to compute temperature at the waveguide surface. For example, by determining the difference (TD−TU) as a percentage of the time base, and using the result as an entry into a temperature table identifying temperature as a function of this fraction, we can compute temperature. The temperature indication gives some indication of the water content in the ice. It can also be used to indicate when icing is absent (>32° F.) to allow us to recalibrate $f_{00}$.

As mentioned above, we can also compute the circuit quality factor Q of the waveguide, VTO circuit. The quality factor Q is merely a measure of the sharpness of the peaks. We can obtain such a measure by either computing PU−PD or QU−QD. In an embodiment of the invention actually constructed, we compute both measures of the circuit quality factor Q and average the two. This gives us a measure of the amount of water or other foreign particles, as opposed to ice. The circuit Q is relatively high when the waveguide is perturbed by ice; other materials such as water, grease, etc. produce a lower Q. We can use the circuit quality factor Q as an indication of the "quality" of the ice.

What is claimed is:

1. An instrument for detecting the presence of and measuring the thickness of ice at a measuring location comprising:
   a waveguide located to have its characteristics varied subject to ice accretion at said measuring location, said waveguide having an input port and a separate output port,
   a controllable oscillator with a control input and an output, means connecting said output of said controllable oscillator to said waveguide input port,
   sweep means connected to said control input to provide a control signal to cause said controllable oscillator to sweep in frequency as a function of time,
   detecting means connected to said output port to provide a detection signal with at least one parameter varying as a function of time and related to energy received by said detecting means at said output port,
   peaking means responsive to said detecting means to provide a peaking signal with recognizable transitions corresponding to predetermined points of said detection signal, and
   computing means responsive to said peaking signal for detecting ice presence and thickness at said measuring location.

2. The apparatus of claim 1 in which said control signal of said sweep means provides for a frequency sweep over a range from a first frequency to a frequency at or above an ice free resonant frequency of said waveguide and back to said first frequency and in which said computing means is also responsive to said control signal for detecting ice presence and for measuring ice thickness.

3. The apparatus of claim 2 in which said detection signal is symmetric about a point in time at which said sweep frequency changes slope, with a relative minimum at said point in time and with a pair of peaks located symmetric to said relative minimum,
   wherein said peaking signal incorporates the time location of said peaks of said detection signal, and wherein said computing means determines, from said peaking signal, a change in resonant frequency of said waveguide from said ice free resonant frequency, to determine from the difference between said resonant frequency and said ice free resonant frequency, said ice thickness.

4. The apparatus of claim 3 in which said peaking means provides a peaking signal with two pair of complementary transitions, and
wherein said computing means includes first means to determine a time delay between a second and a fourth of said transitions to determine a change in resonant frequency of said waveguide and therefrom an ice thickness parameter.

5. The apparatus of any one of claims 1-3 which further includes:
temperature sensing means located adjacent to said waveguide for producing a temperature signal related to temperature at said waveguide,
comparator means for comparing said temperarure signal with said control signal for producing a binary temperature signal in one state when said temperature signal is in excess of said control signal and in another state when said temperature is below said control signal, and
means coupling said binary temperature signal to said computer means.

6. The apparatus of claim 5 in which said peaking means provides a peaking signal with two pair of complementary transitions, and
wherein said computing means includes first means to determine a time delay between a second and a fourth of said transitions to determine a change in resonant frequency of said waveguide and therefrom an ice thickness parameter.

7. The apparatus of claim 6 wherein said computing means includes second means responsive to said binary temperature signal to determine temperature at said waveguide and to determine a time base for said sweep means to effect said frequency sweep, and wherein said first means determines said change in resonant frequency by dividing said time delay by said time base.

8. The apparatus of claim 6 in which said first means further computes a Q factor for said waveguide by finding one-half of a sum of first and second time delays, said first time delay between first and second transitions of said peaking signal and said second time delay between third and fourth transitions of said peaking signal.

9. The apparatus of of claim 6 in which said computing means includes:
register means responsive respectively to said peaking signal and to said binary temperature signal for indicating the present state of said peaking and binary temperature signals,
a decrementer, counter means coupled to said decrementer for changing state in response to said decrementer for producing time related signals,
multi-byte register means for storing the time related signals from said counter means at the time of transitions in said peaking and binary temperature signals, respectively, and
wherein said first means obtains said time delay by reference to said multi-byte register means.

10. The apparatus of claim 9 in which said computing means further includes:
logic means responsive to present states of said peaking and said binary temperature signals for determining a progression of said signals through a cycle and for loading a current time related signal into a selected location of said multi-byte register means, and
interrupt means responsive to a transition in one of said peaking or binary temperature signal for initiating operation of said logic means to load said multi-byte register means.

11. The apparatus of claim 10 in which said logic means loads said current time related signal into said multi-byte register means at a location selected in dependence on said progression through said cycle.

12. The apparatus of claim 10 in which said logic means includes abort means to determine whether said progression is proceding normally and in the event said progression is abnormal said abort means aborts data gathering until a later cycle.

13. The apparatus of claim 1 in which said sweep means includes:
ramping means including an integrator and a flip-flop to provide a ramping signal rising in voltage from a first to a second voltage and back down at a nearly constant slope, and a DC amplifier including an oscillator, a regulator driver and a voltage doubler and means superimposing said ramping signal on an output of said DC amplifier.

14. The apparatus of claim 13 in which said DC amplifier and said ramping means are AC coupled.

15. The apparatus of claim 1 in which said peaking means includes:
amplifier means coupled to said detecting means for amplifying an output of said detecting means,
means for charging a capacitor with a signal from said amplifying means,
comparator means for comparing a charge on said capacitor with an output of said amplifying means, and
coupling means for coupling an output of said comparator means to said computing means.

16. The apparatus of claim 15 which further includes: a pair of comparators, each with two inputs, one input of each coupled to said control signal, the other input of each coupled to first and second reference voltages, respectively, and means coupling the output of each of said pair of comparators for disabling said comparator means.

17. The apparatus of claim 16 which further includes display means responsive to said computer means for displaying at least one measured value related to ice at said measuring location.

18. The apparatus of claim 17 in which said display means displays a numerical quantity related to ice thickness.

19. The appararus of claim 1 in which said instrument measures ice thickness at plural measuring locations.

20. The apparatus of claim 19 which includes a separate waveguide, controllable oscillator, sweep means, detecting means and peaking means for each measuring location and a single computing means.

21. A method of detecting the presence and thickness of ice at a measuring location comprising:
providing a waveguide located to have its electrical characteristics varied, subject to ice accretion at the measuring location, the waveguide being provided with an input port and separate output port,
energizing the waveguide with electrical energy, at its input port, said electrical energy sweeping in frequency as a function of time, peak detecting energy received at said output port of said waveguide to provide a peaking signal with recognizable transitions corresponding to energy received at said output port of said waveguide, and determining from said recognizable transitions, ice presence and ice thickness at said measuring location.

22. The method of claim 21 wherein said energizing step includes sweeping in frequency from a first frequency to a frequency at or above an ice-free resonant frequency of said waveguide and back to said first frequency.

23. The method of claim 21 in which said determining step comprises measuring ice thickness by measuring a delay between selected ones of said recognizable transitions.

24. The method of claim 21 in which said energizing step includes the step of:
generating a control signal representing said frequency sweep, said control signal making a transition from a first voltage to a second lower voltage at a constant slope, and then rising from said second voltage to said first voltage at a second slope equal but of opposite sign to said constant slope,
generating a temperature signal corresponding to temperature adjacent said waveguide,
comparing said temperature signal to said control signal for generating a binary temperature signal having a first transition when said control signal decreases below said temperature signal and a second transition when said control signal exceeds said temperature signal, and
wherein said determining step is responsive to said binary temperature signal for determining a time base of said frequency sweep.

25. The method of claim 24 in which said peak detecting step produces four recognizable transitions and in which said determining step also determines a Q factor for said waveguide by determining one-half of a sum of first and second time delays, said first time delay between first and second transitions of said peaking signal and said second time delay between said third and fourth transitions of said peaking signal.

26. The method of claim 25 in which said determining step:
identifies each of said recognizable transitions in said peaking signal as well as said first and said second transitions in said binary temperature signal,
verifying that all of said transitions have occurred in one of a plurality of predetermined sequences or not verifying that all of said transitions have occurred in said one of a plurality of predetermined sequences,
aborting a measurement if a sequence of said transitions is not verified,
and otherwise recording a time parameter for each of said transitions in said cycle, and
computing selected differences of said time parameters for measuring ice thickness.

27. The method of claim 24 in which said peak detecting step produces four recognizable transitions, and in which said determining step verifies that said fourth recognizable transitions in combination with said first and second transitions occurs in one of a predetermined number of sequences or not verifying that said recognizable transitions and first and second transitions occur in one of said predetermined sequences,
continuing a measurement cycle in the event of said verification or otherwise aborting a measurement cycle.

28. The method of claim 21 which includes the further step of generating a cyclical signal identifying a cycle of said frequency sweep, said cyclical signal having a first transition at a first point in a cycle, a second transition at a point intermediate in said cycle and a third transition at a point in another cycle corresponding to said first point,
and in which said peak detecting step includes generating a peaking signal with four recognizable transitions,
and in which said determining step identifies each of said four recognizable transitions and said first and second transitions in said control signal for verifying or not verifying whether or not all said transitions occur in one of a few predetermined sequences,
aborting said determining step in the event said identifying step does not verify said predetermined sequence, and otherwise continuing with said determining step.

29. The method of claim 28 wherein said determining step identifies a time related parameter for each of said transitions, and further includes a step of determining selected differences between said time related parameters for determining ice thickness.

* * * * *